(12) United States Patent
Bansal et al.

(10) Patent No.: US 12,094,031 B2
(45) Date of Patent: Sep. 17, 2024

(54) MIXED REALITY BASED CONTEXTUAL EVALUATION OF OBJECT DIMENSIONS

(71) Applicant: INTERNATIONAL BUSINESS MACHINES CORPORATION, Armonk, NY (US)

(72) Inventors: Shefali Bansal, Bangalore (IN); Jagadesh Ramaswamy Hulugundi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/654,421

(22) Filed: Mar. 11, 2022

(65) Prior Publication Data
US 2023/0306652 A1    Sep. 28, 2023

(51) Int. Cl.
| G06T 11/60 | (2006.01) |
| G02B 27/01 | (2006.01) |
| G06F 3/01 | (2006.01) |
| G06T 11/00 | (2006.01) |
| G06T 19/00 | (2011.01) |
| G06V 20/20 | (2022.01) |
| G06V 40/10 | (2022.01) |
| G06V 40/20 | (2022.01) |

(52) U.S. Cl.
CPC .............. *G06T 11/00* (2013.01); *G06V 20/20* (2022.01)

(58) Field of Classification Search
CPC ................................ G06T 11/00; G06V 20/20
See application file for complete search history.

(56) References Cited

U.S. PATENT DOCUMENTS

| 9,557,161 | B2 | 1/2017 | Bae |
| 9,926,131 | B1* | 3/2018 | Lehmann ............. G06Q 10/083 |
| 9,965,793 | B1* | 5/2018 | Hasan ............... G06F 16/24561 |
| 10,452,789 | B2* | 10/2019 | Madmony ............... G06F 30/00 |
| 10,504,061 | B1* | 12/2019 | Shi ..................... G06Q 10/0838 |
| 10,762,716 | B1* | 9/2020 | Paul ........................ G06F 3/013 |
| 11,321,565 | B2* | 5/2022 | Furlan ................... G06T 19/006 |
| 11,568,620 | B2* | 1/2023 | Delgado ............... G06F 3/0488 |
| 2008/0071559 | A1 | 3/2008 | Arrasvuori |

(Continued)

FOREIGN PATENT DOCUMENTS

| CN | 111246264 A | 6/2020 |
| CN | 112884556 A | 6/2021 |
| CN | 109974581 B | 7/2021 |
| CN | 110858375 A | 5/2023 |
| WO | 2023169331 A1 | 9/2023 |

OTHER PUBLICATIONS

Anonymous, "Calculate Distance or Size of an Object in a Photo Image", Printed on Jan. 10, 2022, 17 pages, Published by Scan Tips, <https://www.scantips.com/lights/subjectdistance.html>.

(Continued)

*Primary Examiner* — Motilewa Good-Johnson
(74) *Attorney, Agent, or Firm* — Tihon Poltavets (57) ABSTRACT

A processor may analyze a target area. The processor may identify, from the analyzing, one or more objects in the target area. The processor may evaluate each of the one or more objects in the target area. Evaluating each of the one or more objects may include measuring each of the one or more objects and determining a purpose for each of the one or more objects. The processor may generate, based on the evaluating, a placement for each of the one or more objects.

12 Claims, 5 Drawing Sheets

(56) References Cited

U.S. PATENT DOCUMENTS

| | | | | |
|---|---|---|---|---|
| 2012/0158385 | A1* | 6/2012 | Arunapuram | G06Q 10/083 703/6 |
| 2012/0224052 | A1 | 9/2012 | Bae | |
| 2014/0285522 | A1* | 9/2014 | Kim | G06Q 30/0601 345/633 |
| 2017/0323488 | A1* | 11/2017 | Mott | G06Q 30/0643 |
| 2018/0061255 | A1* | 3/2018 | Ekambaram | G06F 16/44 |
| 2018/0096528 | A1* | 4/2018 | Needham | G06T 7/70 |
| 2019/0197909 | A1* | 6/2019 | Ekambaram | G06F 16/26 |
| 2019/0202055 | A1* | 7/2019 | Wang | B25J 9/1697 |
| 2019/0213610 | A1* | 7/2019 | Okimoto | G06Q 10/06393 |
| 2019/0228581 | A1* | 7/2019 | Dascola | G06F 3/048 |
| 2020/0117336 | A1* | 4/2020 | Mani | F25B 49/005 |
| 2020/0125322 | A1* | 4/2020 | Wilde | G06F 1/163 |
| 2020/0167567 | A1 | 5/2020 | Heo | |
| 2020/0283245 | A1* | 9/2020 | Gualtieri | B65G 65/30 |
| 2021/0090449 | A1* | 3/2021 | Smith | G06V 20/40 |
| 2021/0383616 | A1* | 12/2021 | Rong | G06T 19/20 |
| 2021/0398338 | A1* | 12/2021 | Philion | G06N 3/08 |
| 2022/0012498 | A1* | 1/2022 | Tan | G06V 20/20 |
| 2022/0075708 | A1* | 3/2022 | Saha | G06F 11/3664 |
| 2022/0100279 | A1* | 3/2022 | Lee | G06T 19/20 |
| 2022/0130126 | A1* | 4/2022 | Delgado | G06F 3/04842 |
| 2022/0284700 | A1* | 9/2022 | Okino | G06Q 10/063114 |
| 2022/0331047 | A1* | 10/2022 | Shelton, IV | A61B 17/07207 |

OTHER PUBLICATIONS

Anonymous, "System and Method for Recommendation of Arrangement of Nonstandard and Standard Size Physical Articles/Packages Using Digital/Virtual Optimization Technique" (Abbreviated version), Published Oct. 6, 2016 by IP.com, 2 pages, <https://priorart.ip.com/IPCOM/000247780>.

Cybdom, "Flutter Tutorial: Object Size Calculation App", Printed on Jan. 10, 2022, 15 pages, Published by Cybdom Tech, <https://cybdom.tech/flutter-tutorial-object-size-calculation-app/>.

Dachis, A., "Photo Measure Helps You Track the Dimensions of Indoor Spaces", Published on Mar. 10, 2011 by Life Hacker, 4 pages, <https://lifehacker.com/photo-measure-helps-you-track-the-dimensions-of-indoor-5779233>.

Mell, et al., "The NIST Definition of Cloud Computing", Recommendations of the National Institute of Standards and Technology, U.S. Department of Commerce, Special Publication 800-145, Sep. 2011, 7 pgs.

"Patent Cooperation Treaty PCT Notification of Transmittal of the International Search Report and the Written Opinion of the International Searching Authority, or the Declaration", Applicant's file reference F22W3394, International application No. PCT/CN2023/079581, International filing date Mar. 3, 2023, Date of Mailing May 19, 2023, 7 pages.

* cited by examiner

MIXED REALITY BASED CONTEXTUAL EVALUATION OF OBJECT DIMENSIONS

BACKGROUND

The present disclosure relates generally to the field of dimensional analysis, and more specifically to evaluating fitment of an object in a target area.

Oftentimes people are challenged in situations for evaluating the physical dimensions of objects in relation to their actual fitment on/in a target area. This occurs during many scenarios in day-to-day life, such as, business personnel who are on-site visiting a manufacturing plant and deliberating on machines to be pressed into action given real-estate constraints, or a shopper at a physical retail store exploring to buy furniture for their home/office, or an individual at a car showroom evaluating options of a new car comfortably being parked on the space at their home.

SUMMARY

Embodiments of the present disclosure include a method, computer program product, and system for evaluating fitment in a target area. A processor may analyze a target area. The processor may identify, from the analyzing, one or more objects in the target area. The processor may evaluate each of the one or more objects in the target area. Evaluating each of the one or more objects may include measuring each of the one or more objects and determining a purpose for each of the one or more objects. The processor may generate, based on the evaluating, a placement for each of the one or more objects.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of dimensional analysis, and more specifically to evaluating fitment of an object in a target area. While the present disclosure is not necessarily limited to such applications, various aspects of the disclosure may be appreciated through a discussion of various examples using this context.

Oftentimes people are challenged in situations for evaluating the physical dimensions of objects in relation to their actual fitment on/in a target area. This occurs during many scenarios in day-to-day life, such as, business personnel who are on-site visiting a manufacturing plant and deliberating on machines to be pressed into action given real-estate constraints, or a shopper at a physical retail store exploring to buy furniture for their home/office, or an individual at a car showroom evaluating options of a new car comfortably being parked on the space at their home, etc.

On multiple accounts, these situations are handled with manual intuition and typically a user does not have conviction in their decision making. As a result, this leads to evaluation errors causing loss of time, increased returns of an object, and/or an unsatisfied end user experience.

In some instances, users have a void space around a physical dimension measurement of an object in relation to surrounding objects and an actual fitment on/in a target space in context of the user's preferences. The contextual measurement of other forms of matter (solids, liquids, gases) pose additional challenges around decision making for the user. Consequently, what's needed is a way to enhance positive experiences for users in such situations of making measurements more in-line with their contextual preferences (e.g., car on the right side of the garage, couch in the center of the living room, etc.).

Accordingly, what is disclosed herein is an artificial intelligence (AI), mixed reality (MR) and internet-of-things (IoT) based system and method to enable a measurement/evaluation of fitment of objects through machine learnt/derived understanding of a user's preferences, which in turns enables the actual fitment view of an object's size/dimensions in a contextual view of another object of reference, line-of-sight of a user, location and historical digital preferences around the affinity or aversion considerations of the user.

It is noted that, object measurement through AI techniques and/or user preferences derivation through machine learning mechanisms are traditionally known. The proposed solution disclosed herein adds a new dimension of contextual measurement that leverages these mechanisms and collaborates them with MR and IoT to enable end users to measure their evaluated object in line of sight (or interest) in relation to a contextual view of another object in reference coupled with individual preferences in an ecosystem.

Before turning to the FIGS., it may be beneficial to highlight the features of the solution disclosed herein, namely:

Disclosed is an AI, IoT, and MR based system and method to determine physical dimensions of an object or objects, measure the object's height/length/breadth/weight in the context of line-of-sight of a user, user location, user's realistic purposes of the object in consideration, urgency, historical digital preferences around the affinity or aversion considerations of a user. For example, a warehouse user is unable to put away a pallet box due to inconsistent box sizes from suppliers, attempts 2-3 across bins across aisles and then unsuccessfully raising a flag to warehouse manager. The warehouse user's manual intuition has not helped in attempts and eventually they have wasted their productive hours. The proposed solution will enable warehouse personnel to do their put away tasks more efficiently aligned with their personal choices (e.g., align boxes on the edges of aisles, etc.).

Further disclosed herein, is a solution that recommends/suggests placement/orientation of objects with the measurement done in co-relation to various homogenous or heterogenous objects in surrounding as reference. For example, a baker trying to ship and pack cakes into a box for delivery is unable to accommodate additional objects such as, candles and balloons. The baker uses their manual intuition, but it results in them re-doing the packing every time after all the items are individually packed. The baker does not have a pro-active way of knowing if all the items can be packed in the box considering that measurement needs are always a mixture of homogenous and/or heterogenous in nature. The proposed solution enables the baker to do the packing right first time.

Further disclosed herein, is a solution that derives the measurement specifications and recommends alternate objects in the surrounding of the user, which meet the purpose specifications (e.g., sizing and/or actual usage of the object(s)). For example, a family has moved into a new house and is struggling with set setting up/placing/orienting their existing furniture, kitchen accessories, etc. into shelves, modular kitchen locations, wardrobes, and crockery units, which are furnished. The family uses trial and error to move things around, which costs them a week to finally put everything things in a correct place. The family does not have a mechanism of system driven recommendations for putting their objects in the correct place in the context of surrounding space and objects inline of consideration. The proposed solution will enable the family to set up their house quickly aligned with their personal preferences.

Further disclosed herein, is a solution that derives the dimension measurement for solids, liquids, or gaseous forms of matter through multiple IoT devices in line with their respective units of measure. For example, a car is driving at 'x' miles per hour, and it needs to travel 300 miles more to reach a destination that is rocky terrain. IoT devices are operationally measuring tire pressure (in PSI normally) and surfacing that on the dashboard for the driver's view. However, the driver does not understand if the current pressure will allow them to reach the destination on time and safely. The driver manually keeps checking his dashboard to see if there is a decrease in tire pressure variation but cannot help the situation. The proposed solution will enable the driver to pro-actively know if they can safely reach their destination by recommending the maximum distance they can drive safely in the context of the car and/or road condition, map, destination and/or other IoT data available in car.

Further disclosed herein, is a solution that employs reinforced machine learning techniques to derive reward/penalties factors to be absorbed into subsequent recommendations based on actual feedback from a user, manual overriding or any digital interactions of a user that enable data to be collected related to context of the usage of an object (e.g., if a user is driving a car, data on the speed and tire pressure is collected; if the user is moving a couch, data on the weight of the couch is collected, etc.).

Turning now to more in-depth examples of embodiments, suppose that a warehouse user is performing a put-away of inconsistent box sizes that are coming from various suppliers. The user wants to put-away 'n' boxes of 2 inch by 3 inch by 4 inch while 'm' boxes of 4 inch by 5 inch by 7 inch on to a large rack. The user further wants to have a view of fitment of these boxes predicted as a measurement before starting the put-away task.

Furthering the example, a first shift user to work on storing the boxes only has access to a 5 foot ladder and normally prefers Rack 3 because it is reachable and comfortable for the first shift user while on the 5 ft ladder, whereas another/second shift user only has access to a 6 foot ladder and prefers Rack 4 because it is reachable and comfortable for the second shift user while on the 6 ft ladder. This is where user related features are considered by the disclosed solution.

Continuing, suppose Rack 4 is 50% full while Rack 3 is 75% full. This is where measurement predictions are required in the context of how other boxes are already placed in those racks for users working in the same area(s) across shifts. The proposed solution accommodates such a need and determines measurement(s) in said context and based on user preferences, and provides a preview on an MR headset for performing the task with certainty of the boxes' placements/orientations.

As another in-depth example of embodiments, suppose a baker is trying to ship and pack cakes into a box for delivery along with additional objects (e.g., accessories), such as, utensils, candles, and balloons. The baker makes several cakes/pastries of different shapes (e.g., square, rectangle, round, double-decker, etc.) and of multiple sizes (e.g., 6-inch round pastry, 8-inch square, etc.)

Additionally, packers at the bakery are dynamically picking up the pastries of varied sizes/shapes from a conveyer belt. The bakery has packers who are left-handed, right-handed, and ambidextrous and they need a measurement view of cake orders on an array of boxes which considers accessories that are required to be included.

Accessory handling and placement inside the box will be different for left-handed and right-handed packers. This is where the user related features of the proposed solution are enacted. It is quite typical to have different utensil sizes/shapes, candle sizes/shapes in relation to large cakes verses small cakes, etc. This is also where the measurement predictions of the proposed solution are required in the context of how cakes in shapes/sizes are to be measured across utensil sizes/shapes and/or candle sizes/shapes.

The proposed solution accommodates such a need and determines measurement in such a context and user preferences, and provides a preview on an MR headset for recommending an appropriate box for packing cakes and accessories.

As a final in-depth example of embodiments, suppose Jim has ordered a bed set online a few days back and is awaiting delivery. Jim, as a shopper at retail store, is planning to buy a bed spread for his bed set that is due arrival.

Without the implementation of the proposed solution: Jim evaluates several bed spreads by touch and feel of fabric, reading specification on the product label, etc. However, Jim is not convinced about the fitment of the bed spread from a size perspective. Jim reaches out to a store associate and seeks advice on measurement but is only told that the bed spread fits queen size beds. Jim is in a dilemma and in deliberation to buy/add the bed spread to his cart without opening the bed spread seal cover for validating the physical dimensions himself. Jim moves away from the aisle resulting in loss of sale for the store.

With the implementation of the proposed solution: Jim wears a MR headset upon entering the store. The proposed solution identifies Jim and knows about his recent purchase of a bed set awaiting delivery and guides him to the bed spread section in the store. It is noted that the proposed solution may know of Jim's recent purchase via an opt-in user profile associated with Jim or an opt-in prompt that allows Jim to decide if he wants his data shared.

Continuing, upon determining a line of sight for Jim on a specific bed spread (e.g., the specific bed spread is in eyesight), the proposed solution immediately/automatically enables Jim into a MR experience on how the fitment of bed spread will look on his newly ordered bed set. Jim gets the experience of this fitment without opening the seal cover of bed spread.

Accordingly, the proposed solution provides him the relevant dimensions (in Jim's preferred unit of measure such as inches, feet, meters, etc.) for his preferred bed spread in the context of the bed set he has ordered. Jim is delighted with the experience and immediately decides to add the bed spread to his cart.

Figure 1:
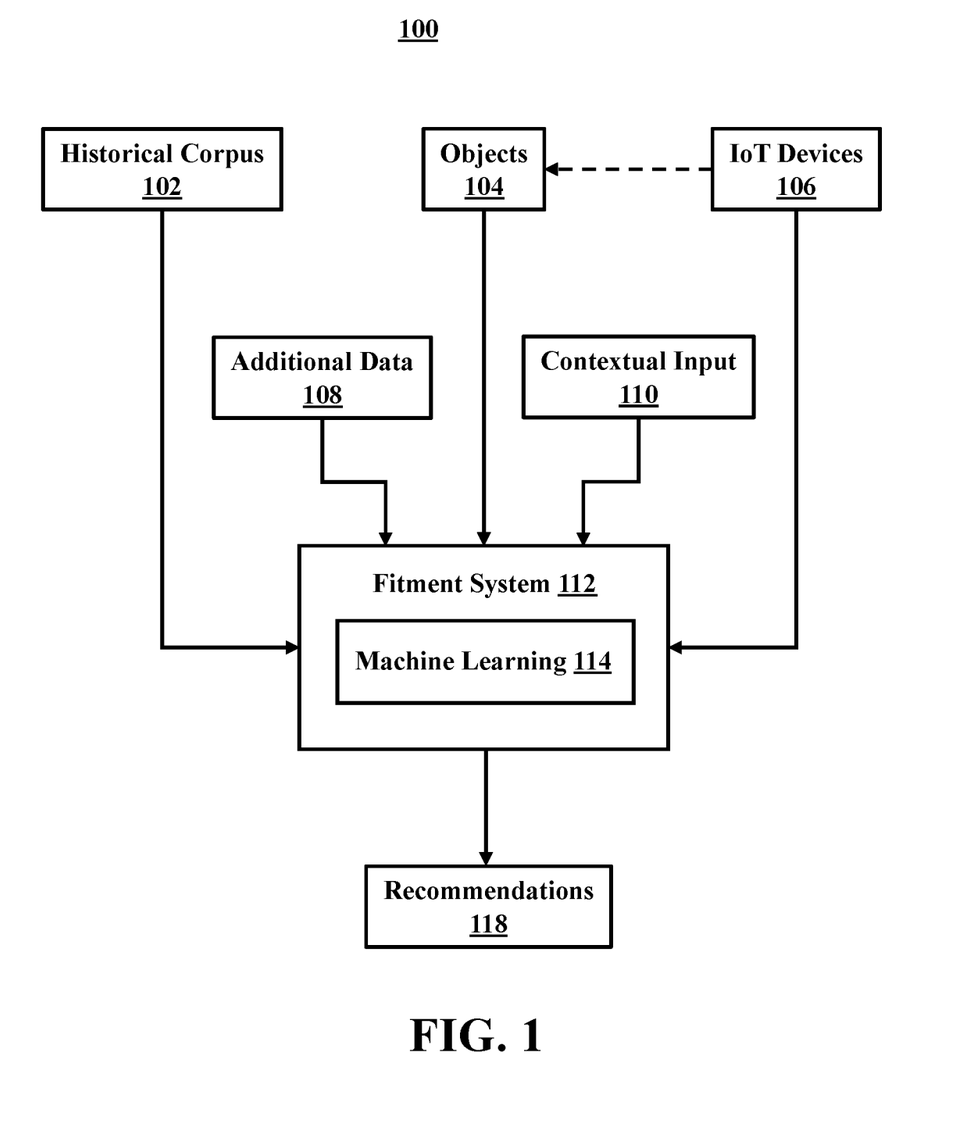
FIG. 1 illustrates a block diagram of an example architecture for evaluating fitment in a target area, in accordance with aspects of the present disclosure.

Referring now to FIG. 1, illustrated a block diagram of an example architecture 100 for evaluating fitment in a target area, in accordance with aspects of the present disclosure. As depicted, the system 100 includes an historical corpus 102 (e.g., of measurements, dimensions, orientations of objects, etc.), objects 104 (e.g., objects in consideration), IoT Devices 106 (e.g., sensors, smartphones, MR headsets, etc.), additional data 108 (e.g., user profile data, purchases, etc.), contextual input 110 (e.g., measurement context, user context, where a user wants to place an object, etc.), a fitment system 112 with machine learning 114, and recommendations 118 (e.g., how to handle/place and object, etc.).

In some embodiments in regard to the example architecture 100, one or more users sign-up for and/or provide their preferences to the example architecture 100. Additionally, enterprises may have operationalized AI, MR, IoT systems (e.g., machine learning 114 may be based in a context of the enterprise's objects support [enterprise A sells gym equipment, thus the machine learning 114 is operationalized to support dimensional analysis of gym equipment and gym areas]) into the example architecture 100.

In some embodiments, the example architecture 100 gets triggered on multiple events which necessitate measurement activity by the IoT devices 106 and/or the fitment system 112 for user purposes across digital or non-digital platforms such, but not limited to: users' line of sight with an intent to measure for their tasks, purchase, inquiry, etc. or any system need to measure for monitoring purposes as in reality.

In some embodiments, the example architecture 100 has initial data to start with, such as: user profiles, historical purchases or transactions (e.g., in the historical corpus 102), reviews, linguistic constraints, affinity, aversion consideration, etc.; a knowledge corpus of digital or non-digital measurement mechanisms of objects 104; IoT historical data of real time monitoring and measurements captured; and/or location specific data as provided by a user, etc.

In some embodiments, one of the IoT Devices 106 is an MR glass device and it provides triggers for analysis by the fitment system 112 based on the below explained steps.

In some embodiments, the example architecture 100 identifies the user who wears the MR glass, which is a smart wearable device. The example architecture 100 understands the user's intent of measurement and is aware of user needs through data sources such as those provided from the additional data 108 and the contextual input 110.

In some embodiments, when a user's line of sight comes in the visibility of an object in reference (e.g., one specific object of the objects 104), the example architecture 100 starts recognizing the images of individual objects 104 through image recognition techniques such as Region-based Convolutional Neural Network (RCNN).

In some embodiments, post recognition, the example architecture 100 at the fitment system 112 retrieves the physical dimensions of the object in reference through machine learning 114 techniques such as, clustering, K-means for object recognition, and characteristics such as height, length, breadth, and weight of the object in reference (which may have been recorded/obtained from the IoT devices 106).

In some embodiments, the object in reference/consideration is mapped with the context of the user's intent (e.g., contextual input 110) and the activity of operation through supervised machine learning techniques (e.g., machine learning 114).

In some embodiments, the example architecture 100 employs supervised machine learning techniques to predict the measurement view on the MR glass through bagging algorithms that encompass multiple machine learning models assembled for enhanced accuracy due to a large, varied set of dependent attributes playing a role in a predicted outcome.

In some embodiments, the example architecture 100 leverages weightage and rank algorithms when more than one heterogenous/homogenous objects 104 are in a surrounding ecosystem in context of the object of reference (e.g., the example architecture 100 via the fitment system 112 takes into account that the orientation/placement of other objects in relation to the object of reference).

In some embodiments, since there will be multi-dimension factors, weightage, and rank assignment (which can be pre-defined to start with), the example architecture 100 determines the relationship of objects 104 through continuous learning.

In some embodiments, the user will be suggested (measurement) recommendations 118 that are generated by the fitment system 112 and view the recommendations 118 on the MR glass device.

In some embodiments, the example architecture 100 via the fitment system 112 provides justification to the user on why such recommendations 118, as derived on the measurement data, were generated and displayed on the MR glass device.

In some embodiments, based on the actual user action (e.g., placing an object in one location, purchasing an object based on sizing recommendations, etc.), the example architecture 100 via the fitment system 112 accounts for this data as feedback for reinforcement learning of the machine learning 114 and incorporates deviations into the algorithm for subsequent recommendations.

Figure 2:
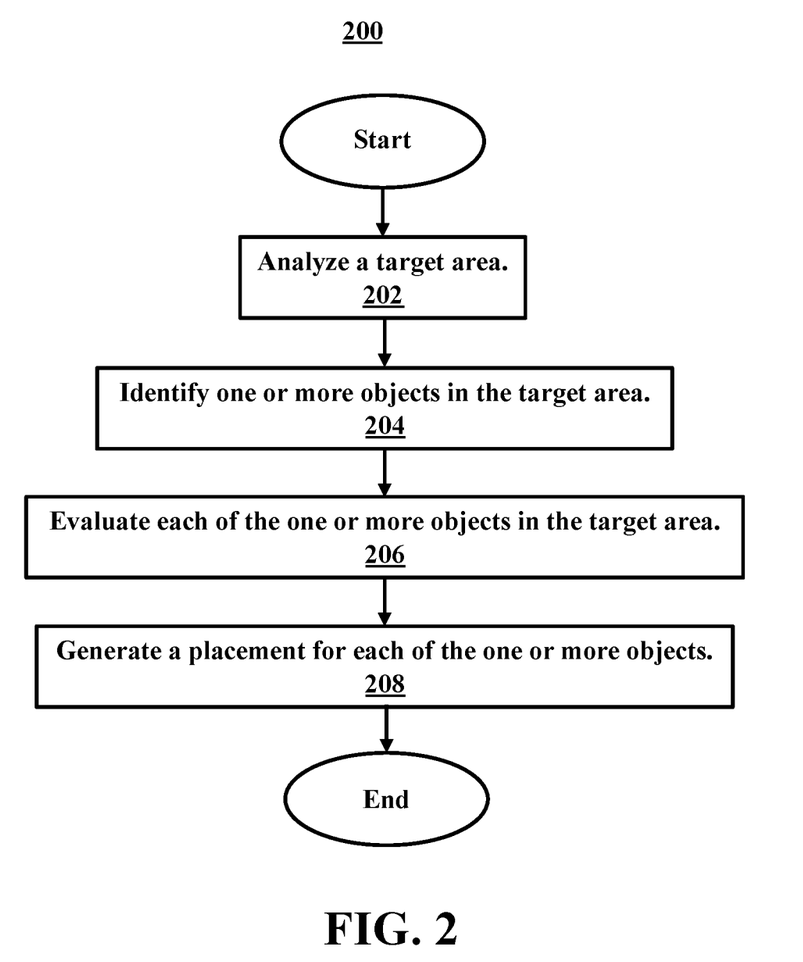
FIG. 2 illustrates a flowchart of an example method for evaluating fitment in a target area, in accordance with aspects of the present disclosure.

Referring now to FIG. 2, illustrated is a flowchart of an example method 200 for evaluating fitment in a target area, in accordance with aspects of the present disclosure. In some embodiments, the method 200 may be performed by a processor (e.g., of architecture 100 of FIG. 1, etc.).

In some embodiments, the method 200 begins at operation 202, where the processor analyzes a target area (e.g., fulfillment center, living room, etc.). In some embodiments, the method 200 proceeds to operation 204, where the processor identifies, from the analyzing, one or more objects in the target area (or to be placed in the target area) (e.g., boxes, a couch, etc.).

In some embodiments, the method 200 proceeds to operations 206, where the processor evaluates each of the one or more objects in the target area. The evaluating of each of the one or more objects may include measuring each of the one or more objects, and/or determining a purpose for each of the one or more objects (e.g., the couch is 10 feet long and is predicted to be used for sitting in-front of an entertainment center, the boxes are hard plastic and likely for stackable storage, etc.).

In some embodiments, the method 200 proceeds to operation 208, where the processor generates, based on the evaluating, a placement (orientation, plan for movement, etc.) for each of the one or more objects (e.g., place 36 inch boxes on bottom and then stack 24 inch boxes on top, etc.). In some embodiments, after operation 208, the method 200 may end.

In some embodiments, discussed below, there are one or more operations of the method 200 not depicted for the sake of brevity and which are discussed throughout this disclosure. Accordingly, in some embodiments, the measuring each of the one or more objects may include the processor analyzing, by utilization of one or more IoT enabled devices (e.g., sensors, measuring devices, etc.), the one or more objects. The processor may further determine a state (e.g., solid, liquid, gas, a combination of any of the three, etc.) associated with each of the one or more objects and identify respective units of measurement for each of the one or more objects (e.g., meters, feet, milliliters, cups, etc.).

In some embodiments, generating the placement for each of the one or more objects may include the processor determining whether there is a co-relation between any of the one or more objects (e.g., a bolt and washer are likely to be grouped together in a fulfillment box, etc.), grouping the one or more objects that are determined to be in co-relation, and/or generating a usage plan for the grouping of the one or more objects (e.g., place the washer onto the bolt, etc.).

In some embodiments, generating the usage plan may include the processor generating an instruction for handling of each of the one or more objects in the grouping and displaying to a user the instruction for handling. In some embodiments, the instruction for handling includes which of the one or more objects are to be handled in a specific order.

In some embodiments, generating the placement for each of the one or more objects may include the processor determining that a first object with a purpose is unplaceable in a first area, selecting a second object with the purpose, and assigning the second object a placement in the first area. For example, a large box may be determined to allow a packed item to move around too much during shipment, thus a medium box bay be determined to be used for shipment. Or, as another example, a user's preferred couch may be too large for their new living room, accordingly, the processor would suggest two loungers from the same furniture line.

In some embodiments, the processor may receive feedback (e.g., from a user, from analyzing the outcome of placement) based on the placement for each of the one or more objects, and store the feedback (e.g., with tags) in a database. For example, the processor may suggest that a user place an object on an 18 inch deep shelf, but then identify that an inch of the object is overhanging from the shelf. The processor may take note and for subsequent interactions with similar objects recommend 20 inch deep shelves.

In some embodiments, the processor may analyze a second target area, access the database, identify that the second target area is the same as (or similar to) the target area, and provide a placement for one or more objects in the second target area based on the feedback. For example, an area may be scanned and identified as a shipment center, the processor may identify that it has previously found proper placement for objects in another shipment center and accordingly use the previous information for finding placement in the now identified shipment center.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
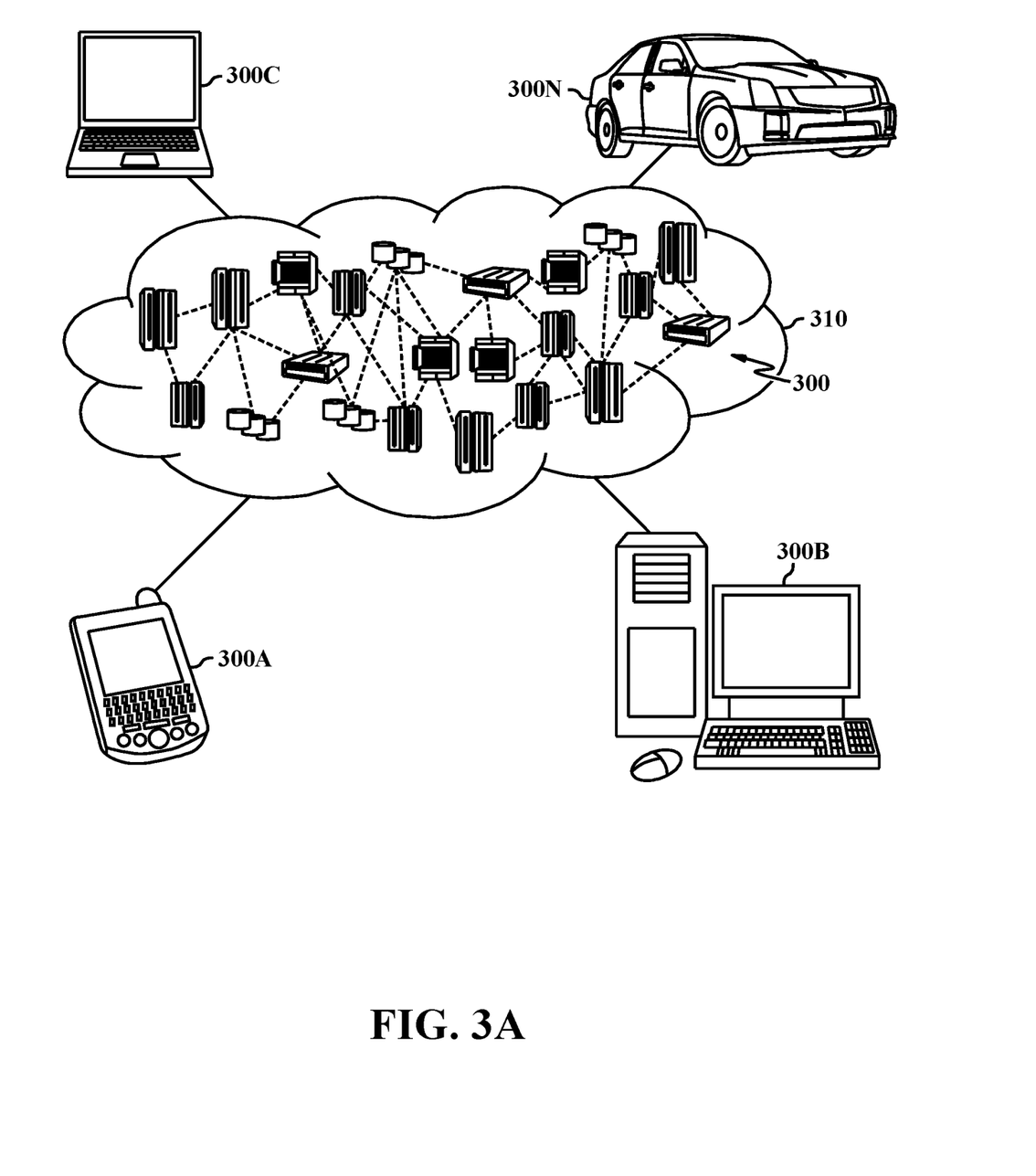
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
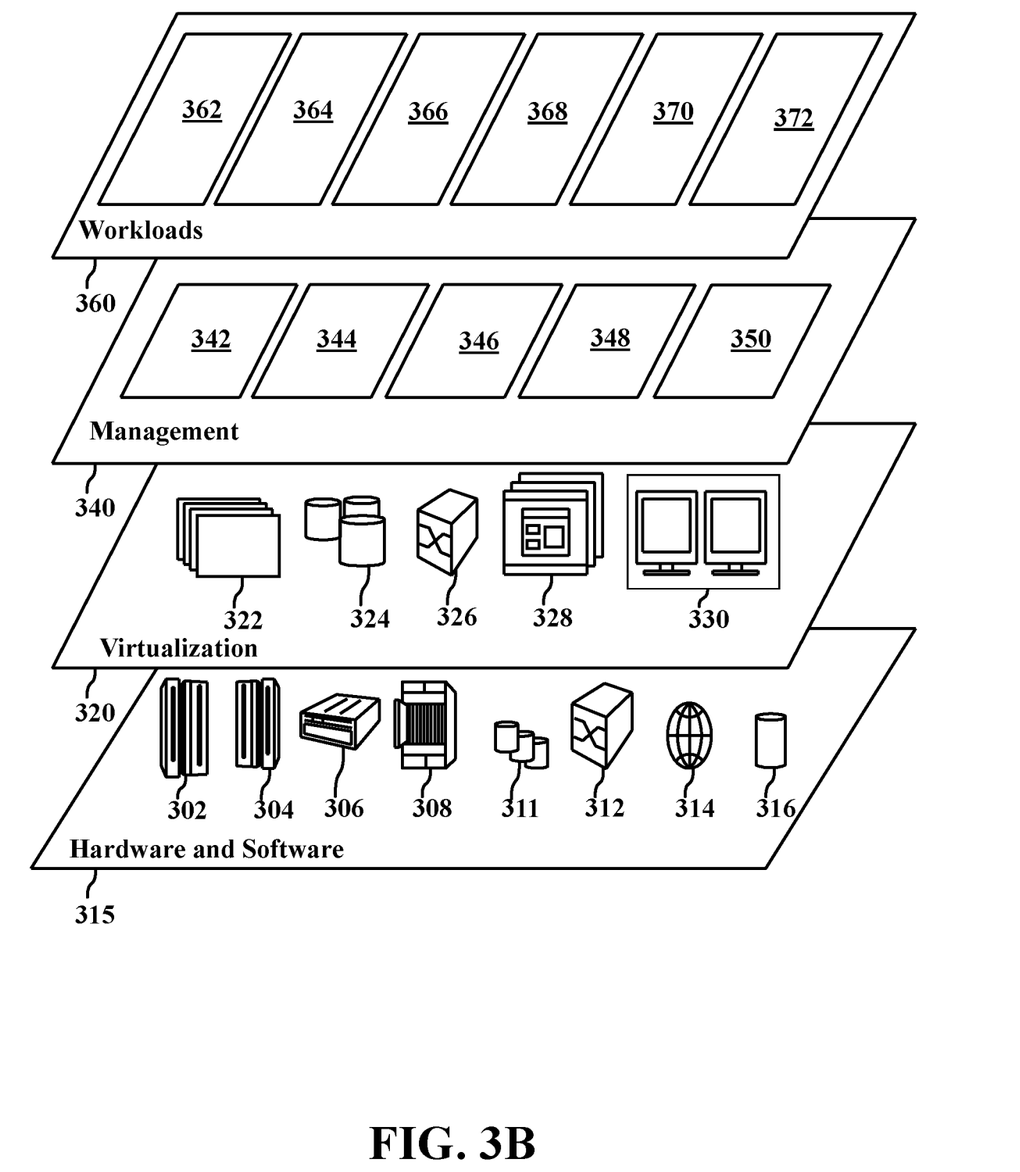
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and evaluating fitment in a target area 372.

Figure 4:
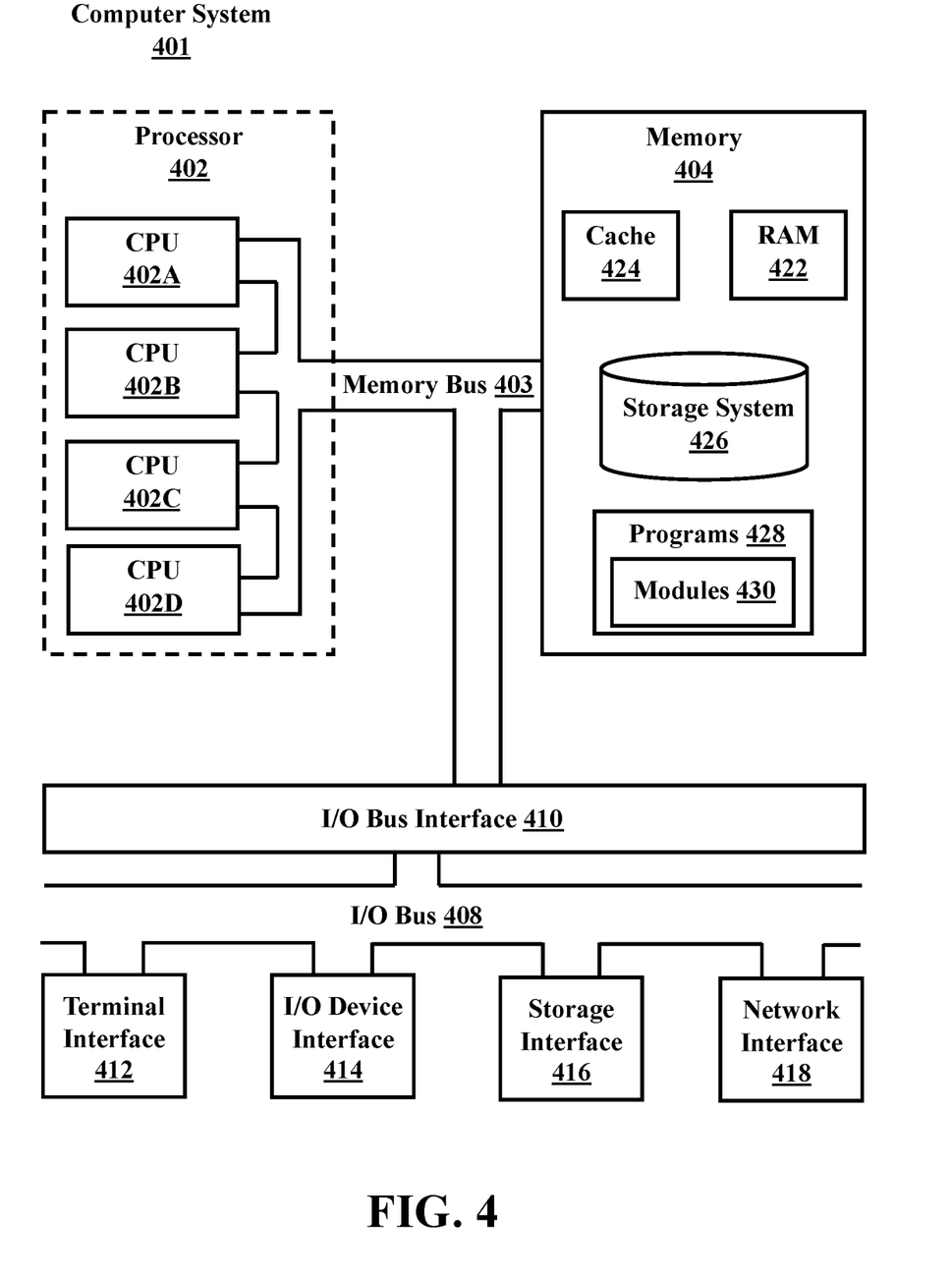
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer system for evaluating fitment in a target area, the computer system comprising:
one or more processors, one or more computer-readable memories and one or more computer-readable storage media;
program instructions, stored on at least one of the one or more storage media for execution by at least one of the one or more processors via at least one of the one or more memories, to analyze a target area;
program instructions, stored on at least one of the one or more storage media for execution by at least one of the one or more processors via at least one of the one or more memories, to identify, from the analyzing, a plurality of objects in the target area;
program instructions, stored on at least one of the one or more storage media for execution by at least one of the one or more processors via at least one of the one or more memories, to evaluate each of the plurality of objects in the target area, wherein evaluating each of the plurality of objects includes measuring each of the plurality of objects
program instructions, stored on at least one of the one or more storage media for execution by at least one of the one or more processors via at least one of the one or more memories, to determine a co-relation between one or more objects from the plurality of objects from the plurality of objects and the target area
program instructions, stored on at least one of the one or more storage media for execution by at least one of the one or more processors via at least one of the one or more memories, to group the one or more objects from the plurality of objects based on the co-relation;
program instructions, stored on at least one of the one or more storage media for execution by at least one of the one or more processors via at least one of the one or more memories, to generate, based on the evaluating, a placement in the target area for the grouping of the one or more objects from the plurality of objects;
program instructions, stored on at least one of the one or more storage media for execution by at least one of the one or more processors via at least one of the one or more memories, to receive, from analyzing an outcome for the placement of the one or more objects, feedback based on the placement for each of the one or more objects; and
program instructions, stored on at least one of the one or more storage media for execution by at least one of the one or more processors via at least one of the one or more memories, to provide a placement recommendation in another target area for a subsequent interaction with a similar object to the one or more objects based on the feedback.

2. The computer system of claim 1, wherein measuring each of the one or more objects further comprising:
program instructions, stored on at least one of the one or more storage media for execution by at least one of the one or more processors via at least one of the one or more memories, to analyze, by utilization of one or more internet-of-things (IoT) enabled devices, the one or more objects from the plurality of objects;
program instructions, stored on at least one of the one or more storage media for execution by at least one of the one or more processors via at least one of the one or more memories, to determine a state associated with each of the one or more objects from the plurality of objects; and
program instructions, stored on at least one of the one or more storage media for execution by at least one of the one or more processors via at least one of the one or more memories, to identify respective units of measurement for each of the one or more objects from the plurality of objects.

3. The computer system of claim 1, further comprising:
program instructions, stored on at least one of the one or more storage media for execution by at least one of the one or more processors via at least one of the one or more memories, to generate an instruction for handling another one or more objects from the plurality of objects, wherein the instruction for handling includes which of the other one or more objects are to be handled in a specific order; and
program instructions, stored on at least one of the one or more storage media for execution by at least one of the one or more processors via at least one of the one or more memories, to display to a user the instruction for handling.

4. The system of claim 1, wherein generating the placement for each of the one or more objects further comprising:
program instructions, stored on at least one of the one or more storage media for execution by at least one of the one or more processors via at least one of the one or more memories, to determine a usage for each of the plurality of objects based on an activity associated with each of the plurality of objects;
program instructions, stored on at least one of the one or more storage media for execution by at least one of the one or more processors via at least one of the one or more memories, to determine that a first object is unplaceable in a first area based on the determined usage for the first object;
program instructions, stored on at least one of the one or more storage media for execution by at least one of the one or more processors via at least one of the one or more memories, to select a second object based on the determined usage for the first object; and
program instructions, stored on at least one of the one or more storage media for execution by at least one of the one or more processors via at least one of the one or more memories, to assign the second object a placement in the target area.

5. A computer-implemented method for evaluating fitment in a target area, the method comprising:
analyzing a target area;
identifying, from the analyzing, a plurality of objects in the target area;
evaluating each of the plurality of objects in the target area, wherein evaluating each of the plurality of objects includes measuring each of the plurality of objects
determining a co-relation between one or more objects from the plurality of objects from the plurality of objects and the target area
grouping the one or more objects from the plurality of objects based on the co-relation;
generating, based on the evaluating, a placement in the target area for the grouping of the one or more objects from the plurality of objects,
receiving, from analyzing an outcome for the placement of the one or more objects, feedback based on the placement for each of the one or more objects; and
providing a placement recommendation in another target area for a subsequent interaction with a similar object to the one or more objects based on the feedback.

6. The method of claim 5, wherein measuring each of the one or more objects further comprising:
analyzing, by utilization of one or more internet-of-things (IoT) enabled devices, the one or more objects from the plurality of objects;
determining a state associated with each of the one or more objects from the plurality of objects; and
identifying respective units of measurement for each of the one or more objects from the plurality of objects.

7. The method of claim 5, further comprising:
generating an instruction for handling another one or more objects from the plurality of objects, wherein the instruction for handling includes which of the other one or more objects are to be handled in a specific order; and
displaying to a user the instruction for handling.

8. The method of claim 5, wherein generating the placement for each of the one or more objects further comprising:
determining a usage for each of the plurality of objects based on an activity associated with each of the plurality of objects;
determining that a first object is unplaceable in a first area based on the determined usage for the first object;
selecting a second object based on the determined usage for the first object; and
assigning the second object a placement in the target area.

9. A computer program product for evaluating fitment in a target area, the computer program product comprising:
one or more computer-readable storage media;
program instructions, stored on at least one of the one or more storage media, to analyze a target area;
program instructions, stored on at least one of the one or more storage media, to identify, from the analyzing, a plurality of objects in the target area;
program instructions, stored on at least one of the one or more storage media, to evaluate each of the plurality of objects in the target area, wherein evaluating each of the plurality of objects includes measuring each of the plurality of objects
program instructions, stored on at least one of the one or more storage media, to determine a co-relation between one or more objects from the plurality of objects from the plurality of objects and the target area
program instructions, stored on at least one of the one or more storage media, to group the one or more objects from the plurality of objects based on the co-relation;
program instruction, stored on at least one of the one or more storage media, to generate, based on the evaluating, a placement in the target area for the grouping of the one or more objects from the plurality of objects;

program instructions, stored on at least one of the one or more storage media, to receive, from analyzing an outcome for the placement of the one or more objects, feedback based on the placement for each of the one or more objects; and program instructions, stored on at least one of the one or more storage media, to provide a placement recommendation in another target area for a subsequent interaction with a similar object to the one or more objects based on the feedback.

10. The computer program product of claim 9, wherein measuring each of the one or more objects further comprising:

program instructions, stored on at least one of the one or more storage media, to analyze, by utilization of one or more internet-of-things (IoT) enabled devices, the one or more objects from the plurality of objects;

program instructions, stored on at least one of the one or more storage media, to determine a state associated with each of the one or more objects from the plurality of objects; and program instructions, stored on at least one of the one or more storage media, to identify respective units of measurement for each of the one or more objects from the plurality of objects.

11. The computer program product of claim 9, further comprising:

program instructions, stored on at least one of the one or more storage media, to generate an instruction for handling another one or more objects from the plurality of objects, wherein the instruction for handling includes which of the other one or more objects are to be handled in a specific order; and program instructions, stored on at least one of the one or more storage media, to display to a user the instruction for handling.

12. The computer program product of claim 9, wherein generating the placement for each of the one or more objects further comprising:

program instructions, stored on at least one of the one or more storage media, to determine a usage for each of the plurality of objects based on an activity associated with each of the plurality of objects;

program instructions, stored on at least one of the one or more storage media, to determine that a first object is unplaceable in a first area based on the determined usage for the first object;

program instructions, stored on at least one of the one or more storage media, to select a second object with based on the determined usage for the first object; and program instructions, stored on at least one of the one or more storage media, to assign the second object a placement in the target area.

\* \* \* \* \*